United States Patent
Chen et al.

(10) Patent No.: US 8,373,615 B2
(45) Date of Patent: Feb. 12, 2013

(54) METHOD AND SYSTEM FOR SPLITTING A DISPLAY ZONE OF A SCREEN, AND COMPUTER PROGRAM PRODUCT

(75) Inventors: Li-Hsuan Chen, Taipei Hsien (TW); Hung-Yang Hsu, Taipei Hsien (TW); Jia-Sheng Wong, Taipei Hsien (TW); Yi-Lang Chi, Taipei Hsien (TW); Yu-Fang Chen, Taipei Hsien (TW); Chang-Chih Han, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 1051 days.

(21) Appl. No.: 12/355,317

(22) Filed: Jan. 16, 2009

(65) Prior Publication Data

US 2010/0002138 A1    Jan. 7, 2010

(30) Foreign Application Priority Data

Jul. 3, 2008    (TW) ................. 97125038 A (51) Int. Cl.
*G09G 5/00* (2006.01)
(52) U.S. Cl. .......... 345/1.1; 345/619; 345/620; 345/629
(58) Field of Classification Search .................. 345/1.1, 345/629, 619–620
See application file for complete search history.

(56) References Cited

U.S. PATENT DOCUMENTS

| | | | |
|---|---|---|---|
| 7,203,359 B1 * | 4/2007 | Padlia et al. | 382/173 |
| 2009/0174728 A1 * | 7/2009 | Ferrer et al. | 345/619 |
| 2009/0273568 A1 * | 11/2009 | Milner | 345/173 |
| 2010/0302163 A1 * | 12/2010 | Ghassabian | 345/168 |

FOREIGN PATENT DOCUMENTS

| | | |
|---|---|---|
| EP | 1837748 A1 | 9/2007 |
| JP | 05-282372 | 10/1993 |
| JP | 10-040061 | 2/1998 |
| JP | 10-254674 | 9/1998 |
| JP | 2007-065909 | 3/2007 |
| JP | 2007-208445 | 8/2007 |
| JP | 2008-146495 | 6/2008 |
| JP | 2008-299566 | 12/2008 |
| TW | 00347518 A | 12/1998 |
| WO | WO-02/25420 A1 | 3/2002 |

OTHER PUBLICATIONS

First Office Action for CN 10104262A, dated Dec. 3, 2010.
Examiner's Comments from an Office Action for JP 2009-157658, dated Nov. 8, 2011, and abridged English translation (8 pages).

* cited by examiner

*Primary Examiner* — William Boddie
*Assistant Examiner* — Leonid Shapiro
(74) *Attorney, Agent, or Firm* — Choate, Hall & Stewart LLP; Charles E. Lyon; Jeffrey S. Pelligrino (57) ABSTRACT

A system for splitting a display zone of a screen is installed in an electronic device having a screen, and includes a detecting module for detecting screen pixels. A splitting processor receives a splitting instruction containing a splitting number n, and splits the display zone into a main display region and a number (n−1) of extension display regions. A total number of width pixels of adjacent ones of the main and extension display regions from left to right of the display zone equals the number of width pixels of the screen. A total number of height pixels of adjacent ones of the main and extension display regions from top to bottom of the display zone equals the number of height pixels of the screen. A display module displays two or more operating interfaces, files, and/or pages of at least one application in the main and extension display regions, respectively.

15 Claims, 6 Drawing Sheets

METHOD AND SYSTEM FOR SPLITTING A DISPLAY ZONE OF A SCREEN, AND COMPUTER PROGRAM PRODUCT

CROSS-REFERENCE TO RELATED APPLICATION

This application claims priority of Taiwanese Application No. 097125038, filed on Jul. 3, 2008, which is incorporated herein by reference in its entirety.

BACKGROUND OF THE INVENTION

1. Field of the Invention

The invention relates to a technique of splitting a display zone, more particularly to a technique of splitting a display zone which is applicable to a widescreen.

2. Description of the Related Art

In recent years, widescreen notebook computers have been quite popular on the market. Although the actual area of a widescreen may not be much larger than that of a traditional screen having an aspect ratio of 4:3, for screens of the same size (i.e., same diagonal length), a widescreen appears to be comparatively larger to the user, and is particularly suited for showing films that are made according to the standard definition video format of 16:9.

In other aspects of application, such as word processing and web browsing, a widescreen is comparatively more suited for displaying two windows side by side than the conventional screen. However, with a conventional widescreen notebook computer, the user can only adjust the display proportion of a document manually or adjust/resize the display area by dragging so as to allow for displaying of two windows side by side. That is, the conventional widescreen notebook computer does not support automatic splitting or tiling of a display zone.

As for current techniques directed to splitting of a display zone of a display, Taiwanese Invention Patent Publication No. 200744391 discloses use of a plurality of image processing units to perform shrinking of four or sixteen images to be displayed, respectively, and to store the processed images temporarily in a memory device. The shrunk images are arranged in predetermined regions of a display zone according to a specific order. For example, if the display zone is to be divided into four tiles, the display zone having 1024×768 pixels is split into four regions each having 512×384 pixels (width divided by 2 and height divided by 2). After shrinking processing, the four images are placed in upper left, upper right, lower left, and lower right regions of the display zone in sequence, thereby achieving the objective of splitting the display zone. However, this technique is suitable merely for splitting the display zone into four or sixteen regular tiles, and is generally used for displaying monitored areas on a security monitoring device. Such technique does not allow a user to conveniently adjust the divided regions as needed, nor does it allow for more design changes, so that it is not suitable for use in the aforesaid widescreen notebook computer.

In short, since a system and method for splitting a display zone of a screen to facilitate user operation of a notebook computer (particularly, a widescreen notebook computer) are unavailable, a need has arisen to develop a system and method that allows for convenient operation by the user and that exploits the special attributes of a widescreen notebook computer.

SUMMARY OF THE INVENTION

Therefore, an object of the present invention is to provide a method for splitting a display zone of a screen, which is based on a concept of extension screens to split the display zone.

Another object of the present invention is to provide a system for splitting a display zone of a screen, which is based on a concept of extension screens, and which can be easily operated as needed.

A further object of the present invention is to provide a computer program product for executing the aforesaid method for splitting a display zone of a screen after being read by a computer.

Accordingly, the method for splitting a display zone of a screen of this invention is executed through a system for splitting a display zone of a screen. The system includes a detecting module for detecting pixels of a screen of an electronic device and information of open applications and/or files, a splitting processor connected to the detecting module for executing splitting, and a display module connected to the screen of the electronic device and the splitting processor for displaying at least one operating interface, at least one file, and/or at least one page of at least one application in display regions, respectively.

The method for splitting a display zone of a screen according to the present invention includes the following steps:

enabling a detecting module to detect pixels $p_0 \times q_0$ of a screen;

enabling a splitting processor to receive a splitting instruction containing a splitting number n, and to split the display zone into a main display zone having $p_i \times q_i$ pixels, and a number (n−1) of extension display regions, each having $p_i \times q_i$ pixels, where i=2~n, wherein a total number of width pixels of adjacent ones of the main and extension display regions from left to right of the display zone of the screen is substantially equal to $p_0$, and a total number of height pixels of adjacent ones of the main and extension display regions from top to bottom of the display zone of the screen is substantially equal to $q_0$; and enabling a display module to display two or more of at least one operating interface, at least one file, and/or at least one page of at least one application that are desired to be displayed in the main and extension display regions, respectively.

The effect of the present invention resides in that the present invention provides humanistic screen splitting software for an electronic device, particularly an electronic device with a widescreen, to allow a user to quickly split a display zone of a screen of the electronic device into a plurality of display regions through simple operations so as to enhance efficiency.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION

Figure 1:
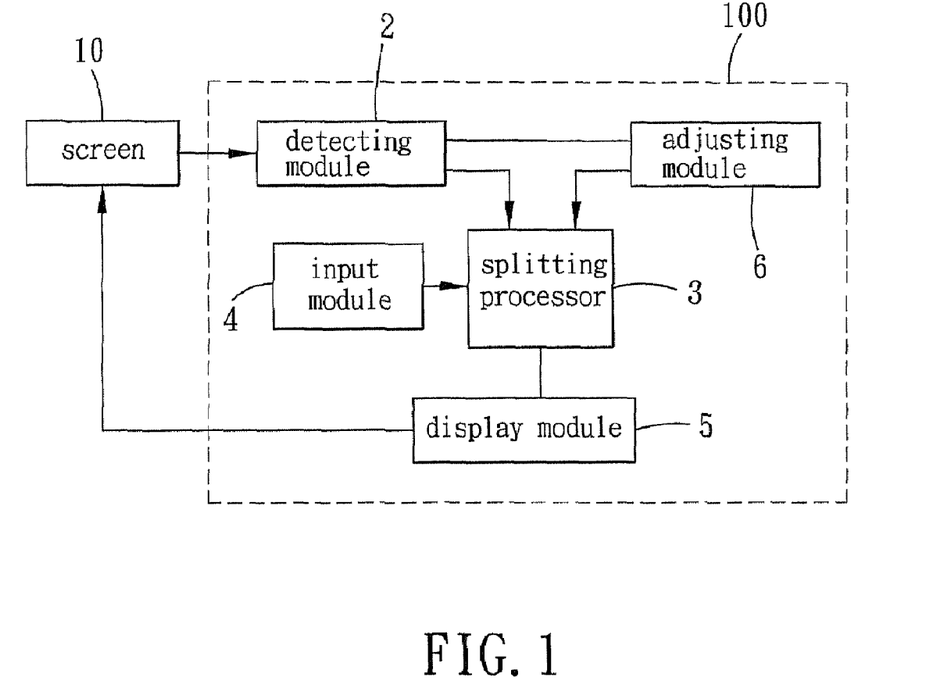
FIG. 1 is a system block diagram to illustrate an embodiment of a system for splitting a display zone of a screen according to the present invention.
Figure 2:
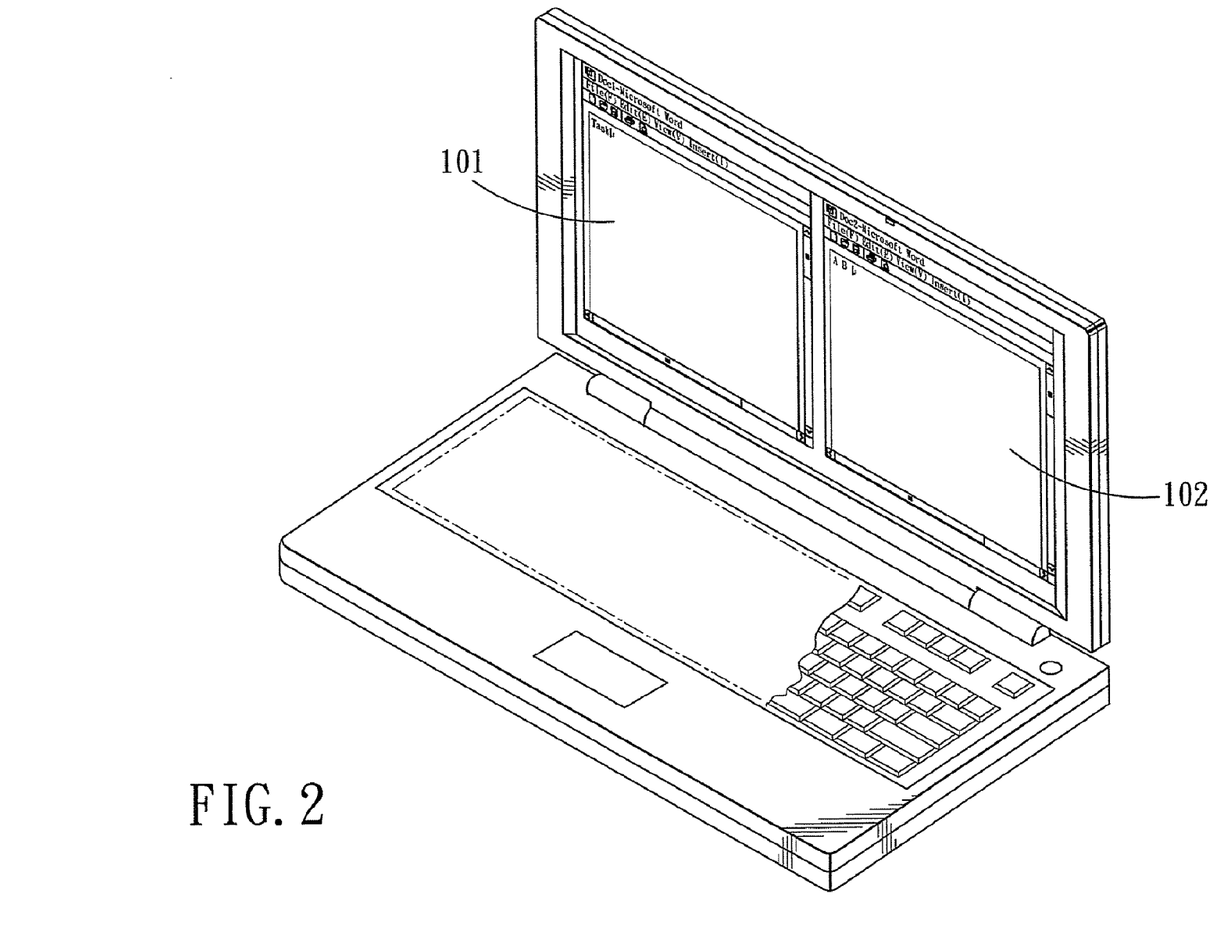
FIG. 2 is a schematic diagram illustrating an embodiment of a widescreen notebook computer installed with the system for splitting a display zone of a screen.

Referring to FIGS. 1 and 2, an embodiment of a system 100 for splitting a display zone of a screen is installed in an electronic device having a screen 10. In this embodiment, the system 100 is installed in a widescreen notebook computer with a screen 10 having a 1600×600 pixel array, but should not be limited thereto in other embodiments of the present invention. The system 100 allows the user to operate and control the splitting of the display zone of the screen 10 with convenience, and to select the contents desired to be displayed in each of display regions. The system 100 for splitting a display zone of a screen includes a detecting module 2, a splitting processor 3, an input module 4, a display module 5, and an adjusting module 6.

The detecting module 2 is for detecting the pixels of the screen 10 and open applications, opened files, and number of pages of the files. In this embodiment, the detecting module 2 detects the pixels of the screen 10 to be 1600×600.

The input module 4 of this embodiment includes software-generated key icons, a graphical user interface (GUI), and physical keys of hardware. The input module 4 is mainly provided for operation by the user to generate various instructions associated with display zone splitting. The operation of the input module 4 in practice will be described hereinbelow. It is noted that the input module 4 is not limited to this described embodiment, and does not necessarily include all of the software/hardware keys and the graphical user interface, i.e., one of them might be selected for use. Furthermore, aside from keys, various known means of inputting instructions, such as a touch panel, a dial, sound control, light control, automatic input using program software, etc., could be adopted.

The splitting processor 3 splits the display zone of the screen 10 according to an instruction given by the user through the input module 4. The principle, logic and technical means in connection with screen splitting will be described below with reference to the flowchart of FIG. 3. The display module 5 displays the applications, files, and/or pages that are preset to be displayed or that are selected by the user via the input module 4 in sequence and correspondingly in the display regions split from the display zone by the splitting processor 3. The adjusting module 6 provides tools and control functions required for adjusting the display regions when the user intends to change the sizes of the display regions. This will be discussed in greater detail below with reference to the flowchart of FIG. 3.

Figure 3:
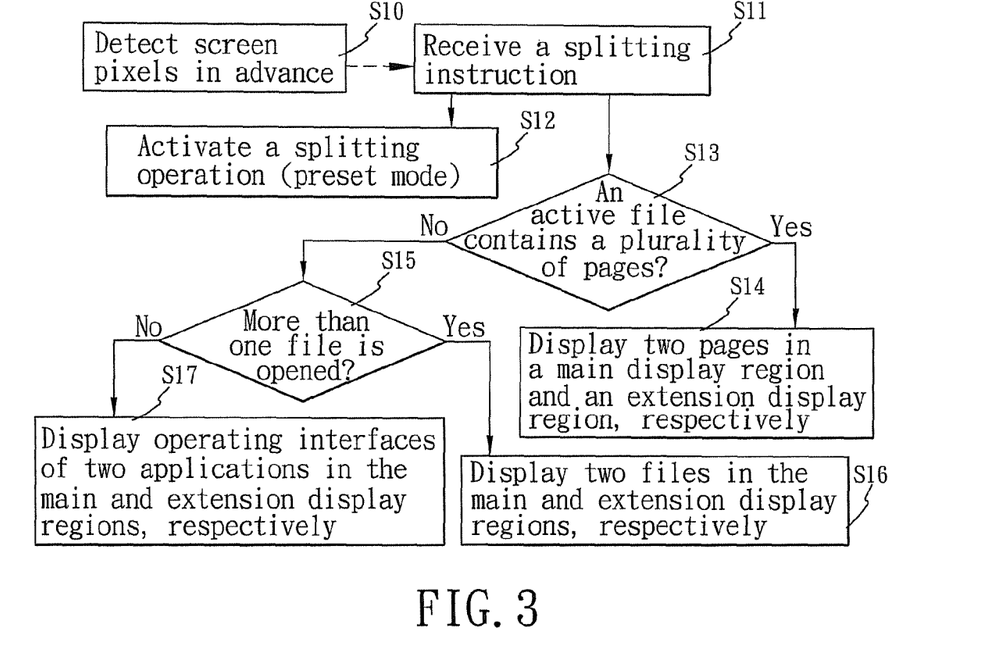
FIGS. 3, 4, 6 and 7 are flowcharts illustrating an embodiment of a method for splitting a display zone of a screen.

Referring to FIGS. 1 and 3, the way the system 100 implements the method for splitting a display zone of a screen in the notebook computer is illustrated by way of an example in which all functions of the system 100 are presented through a series of operating steps. The method includes the following steps:

In step S10, pixels $p_0 \times q_0$ of the screen 10 are detected in advance. In this embodiment, $p_0=1600$, and $q_0=600$.

In step S11, the input module 4 receives a splitting instruction, and transmits the splitting instruction to the splitting processor 3. The splitting instruction is generated by the user through operating the input module 4, and, in practice, may be generated by pressing a corresponding physical key once or by moving a mouse cursor to a corresponding software-generated key icon and clicking on the icon once.

In step S12, the splitting processor 3 activates a splitting operation according to the splitting instruction. In this embodiment, after receipt of the splitting instruction, the splitting processor 3 adopts a preset splitting mode, which is to split the display zone of the screen 10 into two equal halves, i.e., left and right display regions (preset splitting number n=2), which include a main display region 101 (i.e., the left display region in this embodiment) and a first extension display region 102 (i.e., the right display region in this embodiment). Since the preset splitting mode is to split the display zone into two equal halves, the main display region 101 has $p_1 \times q_1$ pixels, where $p_1=1600/2=800$ and $q_1=600$, and the first extension display region 102 has $p_2 \times q_2$ pixels, where $p_2 1600-800=800$, and $q_2=600$.

Step S13 is executed simultaneously with step S12. In step S13, through the operating system of the notebook computer, the detecting module 2 first detects if an active file contains a plurality of pages. If yes, step S14 is executed. If no, step S15 is executed.

In step S14, after steps S12 and S13 are completed, the display module 5 displays the most recently used page and the page following it in the main display region 101 and the first extension display region 102, respectively.

In step S15, the detecting module 2 detects if the number of files opened in the active application is more than one. If yes, step S16 is executed. If no, step S17 is executed.

In step S16, the display module 5 displays the two most recently used files in the main display region 101 and the first extension display region 102, respectively.

In step S17, the display module 5 displays the active application and an operating interface of the most recently opened application in the main display region 101 and the first extension display region 102, respectively.

In other words, when the user operates the key according to the embodiment, the display zone of the screen 10 will automatically switch to a splitting mode, and different pages or files will be displayed side by side (left and right) on the screen 10. It is noted that the aforementioned logical flow regarding the detection and display of the operating interfaces, files or pages of the application(s) is an example to illustrate an exemplary embodiment, and that the present invention should not be limited thereto.

Figure 4:
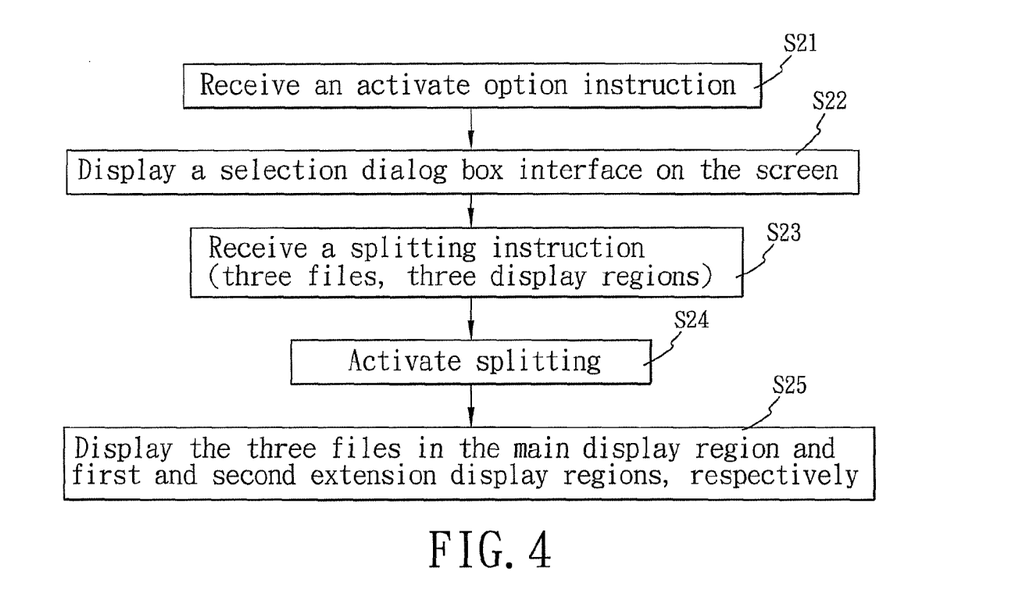

However, if the splitting mode preset in the system 100 or the contents displayed do not meet the requirement of the user after the key is operated once, the user may activate the flow illustrated in FIG. 4 by operating the key twice in succession immediately thereafter within a predetermined period of time.

In step S21, the input module 4 receives an activate option instruction. The activate option instruction is generated by the user through operating the input module 4, and, in practice, may be generated by pressing the corresponding physical key twice or by moving the mouse cursor to the corresponding software-generated key icon and double-clicking on the icon.

Figure 5:
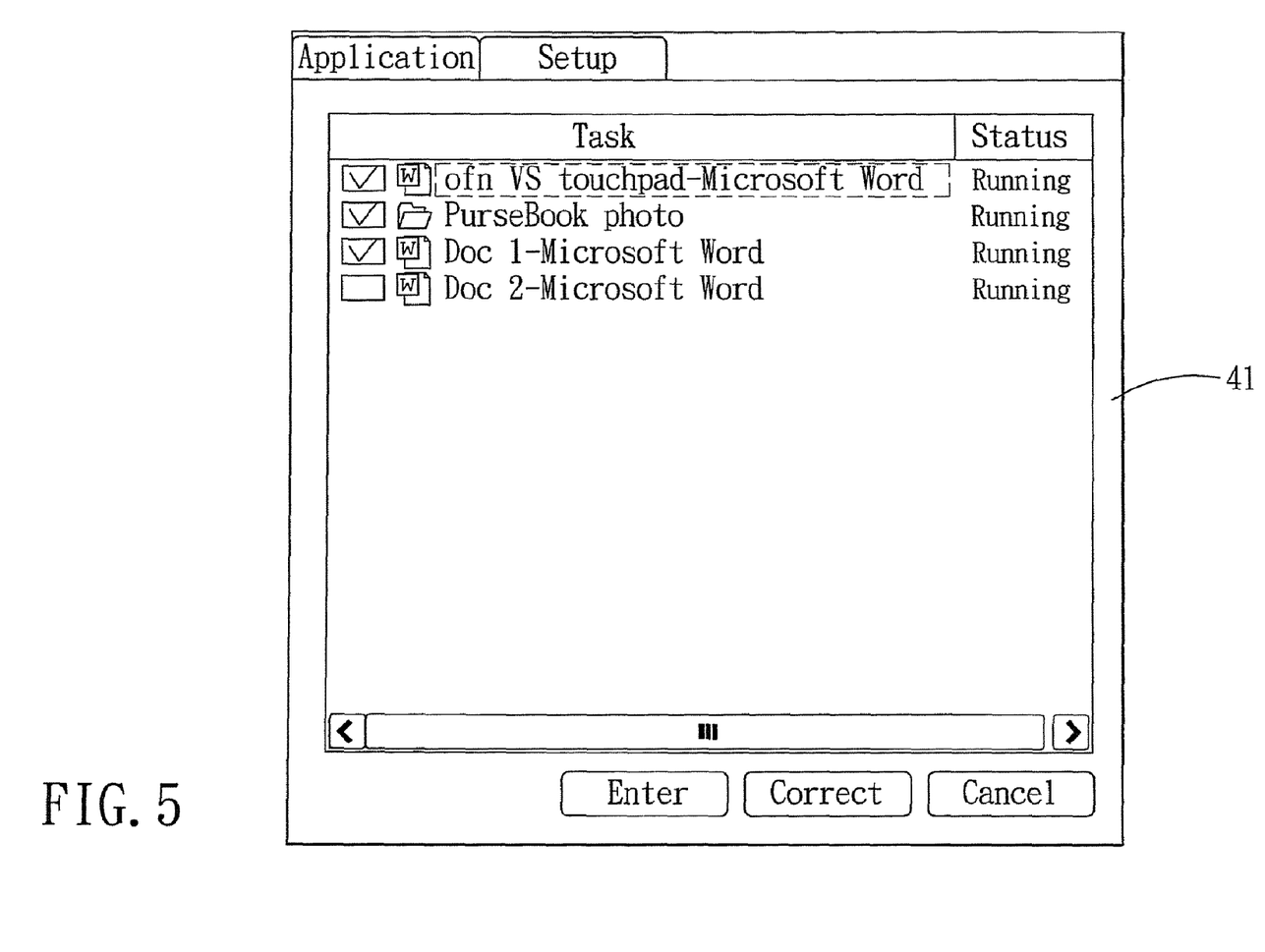
FIG. 5 is a schematic diagram to illustrate an embodiment of a selection dialog box interface that allows a user to select contents desired to be displayed.

In step S22, the input module 4 displays a selection dialog box interface as shown in FIG. 5 on the screen 10. The selection dialog box interface is a graphical user interface, and lists a plurality of applications, files and/or pages that have been opened on the notebook computer for selection by the user, as well as settable options in the open applications, such as hide toolbar, dynamic zoom, etc., which are associated with displaying states.

In step S23, the input module 4 receives a splitting instruction and sends the splitting instruction to the splitting processor 3. The splitting instruction is generated by the user through selecting options in the selection dialog box interface. Therefore, the splitting instruction contains the page(s) or file(s) or application(s) (implying the splitting number n) desired to be displayed, and the settings of the displaying states. In this embodiment, it is assumed that the splitting number is equal to the number of pages, files, or applications selected. As an example, three files are selected in this embodiment. Certainly, the splitting number n may be any plural number, and is not limited to the present disclosure.

In step S24, the splitting processor 3 activates splitting according to the splitting instruction received in step S23. After receipt of the splitting instruction, the splitting processor 3 divides the display zone of the screen 10 according to a preset rule into a main display region (not shown) having 800×600 pixels on the left, and first and second extension display regions (not shown) each having 800×300 pixels on the right and placed one above the other. In this embodiment, the preset rule mentioned above is that: when n=3, the display zone is split into one main (large) display region and two (small) extension display regions; and when n=4, the display zone is split into four equally sized display regions. However, the preset rule is not limited to the aforesaid rule in other embodiments of this invention. For example, the display zone may be divided into unequal display regions or randomly.

In step S25, the display module 5 displays the three files desired to be displayed in the main display region and the first and second extension display regions.

Figure 6:
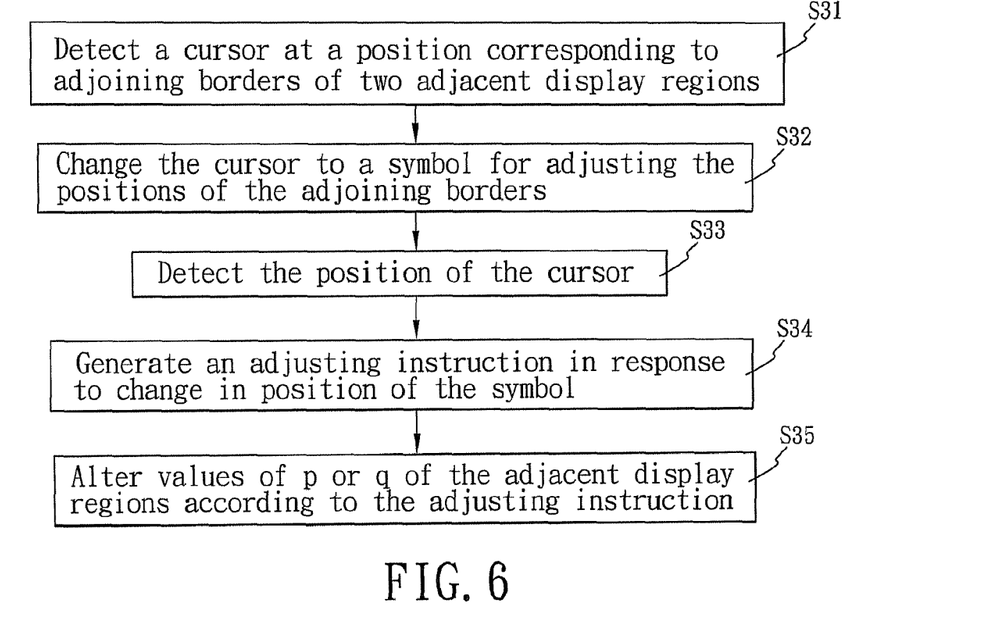

When the user wants to adjust the size of the display regions, an adjusting operation including the following steps may be conducted according to the flow shown in FIG. 6. The point of the adjustment operation is mutual adjustment, i.e., the proportional relationship between adjacent display regions or windows can be changed by dragging.

In step S31, the detecting module 2 detects a cursor at a position corresponding to adjoining borders of two adjacent display regions, and sends this information to the adjusting module 6.

In step S32, the adjusting module 6 changes the cursor to a symbol, such as a double-ended resizing arrow, for adjusting the positions of the adjoining borders of the two adjacent display regions.

In step S33, when the symbol appears, the symbol can be dragged with the mouse to resize the two adjacent display regions. The point of adjusting the display regions is that the proportional relationship between the two adjacent display regions can be simultaneously changed with a single adjusting operation, and the pixel relationship to be described in step S35 below will be maintained during adjustment. The detecting module 2 will continue to detect the position of the symbol, and will send information to the adjusting module 6 once the position of the symbol changes.

In step S34, the adjusting module 6 generates an adjusting instruction in response to a change in position of the symbol, and sends the adjusting instruction to the splitting processor 3. The adjusting instruction contains coordinates of the adjoining borders of the two adjacent display regions.

In step S35, the splitting processor 3 alters the values of p or q of the two adjacent display regions according to the adjusting instruction. The splitting processor 3 splits the display zone according to a criterion that: the sizes of the main display region and each of the extension display regions are adjustable and changeable, as long as the total number of width-pixels of the adjacent display regions from left to right of the display zone of the screen 10 is substantially equal to 1600 (i.e., $p_0$), and the total number of height-pixels of the adjacent display regions from top to bottom of the display zone of the screen 10 is substantially equal to 600 (i.e., $q_0$).

When the user wants to restore to full screen, i.e., to deactivate the display zone splitting mode, the corresponding physical key or software key of the input module 4 is operated once again. The system 100 will take this as a deactivation instruction for the splitting mode.

Figure 7:
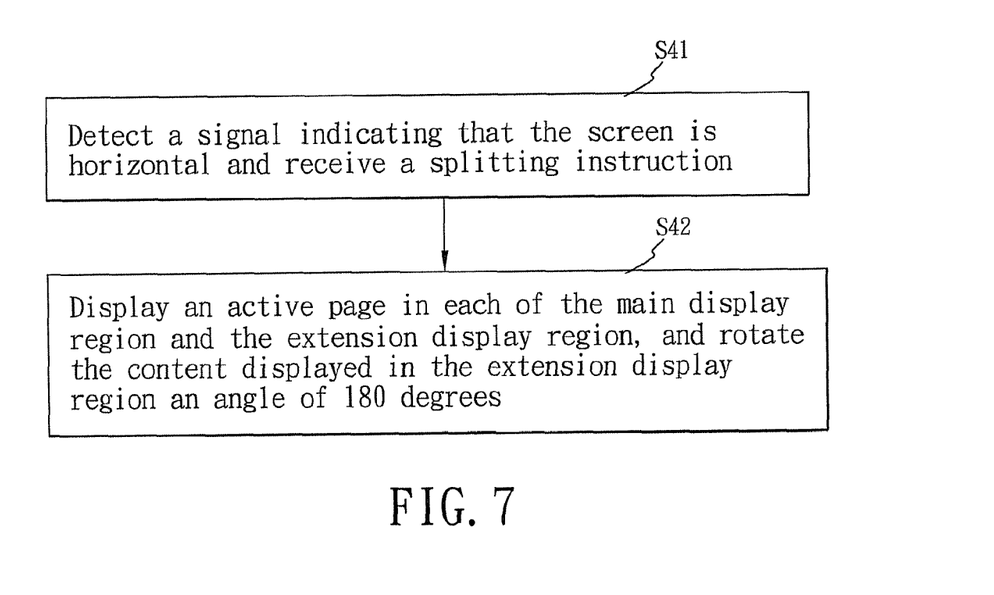

In addition, the system 100 for splitting a display zone of a screen according to some embodiments may be configured to have view-sharing functionality, which can be implemented according to the flow shown in FIG. 7.

In step S41, when the detecting module 2 detects, in conjunction with, for example, but not limited to, a hinge (not shown), that the screen 10 is placed at a substantially horizontal angle or at an angle greater than 180 degrees, the splitting processor 3 receives a splitting instruction (splitting number n=2) for activating the view-sharing function. The detection of the angle of placement of the screen 10 in this embodiment may be achieved with the use of a sensor (not shown). When the screen 10 is over-rotated relative to a body of the notebook computer to a certain extent, the sensor will send a signal indicating that the screen 10 is horizontal to the detecting module 2. The method of detecting a change in the placement angle of the screen 10 is not limited to the above described embodiments of this invention and may be any method known in the industry.

Figure 8:
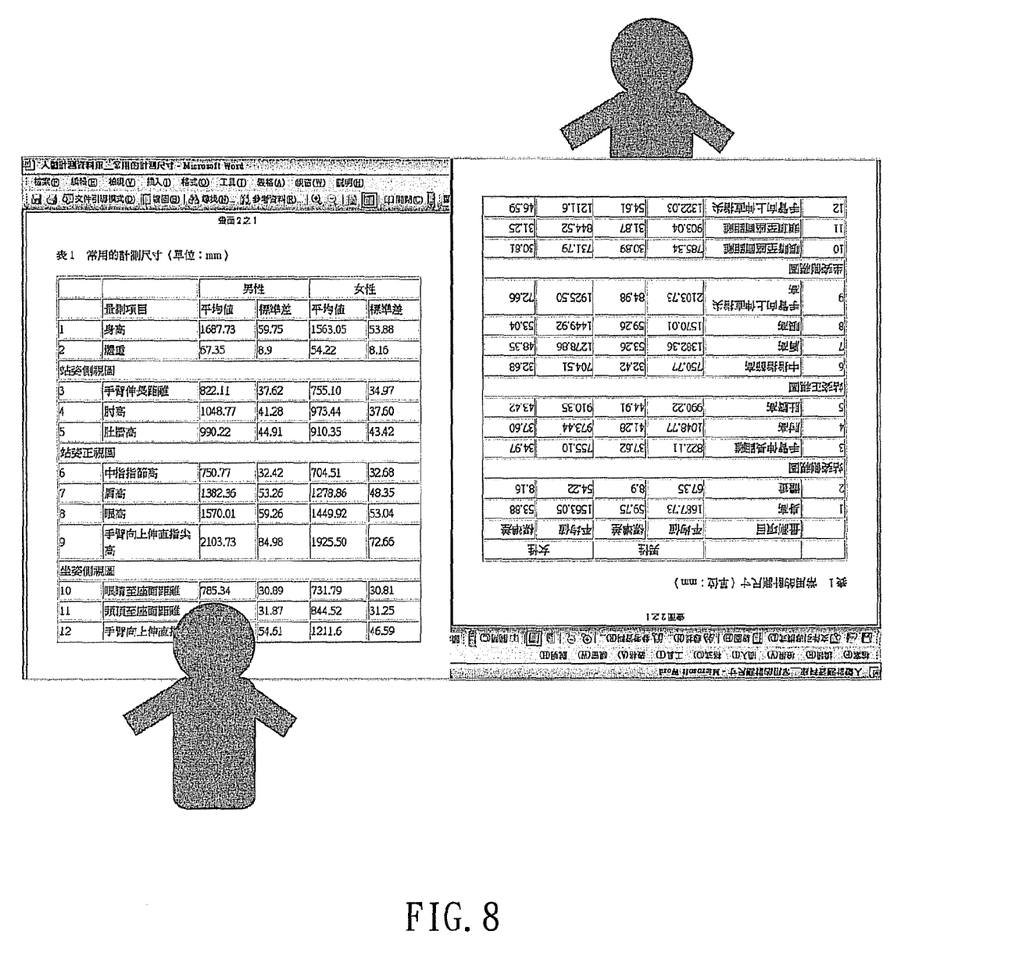
FIG. 8 is a schematic diagram to illustrate an embodiment of a view-sharing function.

In step S42, the display module 5 displays an active page in each of the main display region 101 and the first extension display region 102 (i.e., the same content is displayed in the two display regions), and rotates the content displayed in the first extension display region 102 an angle of 180 degrees. In this mode, the first extension display region 102 is set to be a reproduction of the main display region 101 and is operable in association with the main display region 101.

Accordingly, the user and a person seated opposite to the user may look at the same content of a file or document on the screen 10 from two opposite sides of the screen 10, and when the user manipulates the main display region 101, the first extension display region 102 will respond synchronously with the main display region 101, without requiring the person seated opposite to the user to move or shift in position. Thus, in many embodiments, the present invention is also suitable for use in small-scale meetings or conferences.

When the user no longer needs the view-sharing function, the physical key or software key of the input module 4 may be operated once again, and the system 100 will regard this as a deactivation instruction for the splitting mode. In other embodiments, the physical key or software key may be operated twice in succession to cause the input module 4 to display a selection dialog box interface on the screen 10 for selection.

In sum, embodiments of the systems and methods described herein utilizes the concept of extension screens to split the screen of an electronic device into a main display region and at least one extension display region based on the number of pixels $p_0 \times q_0$ of the screen of the electronic device. Embodiments of the present invention also allows for presetting of an open adjusting mechanism that operates on the condition that the total number of width-pixels of adjacent display regions from left to right of the screen is substantially equal to $p_0$, and that the total number of height-pixels of adjacent display regions from top to bottom of the screen is substantially equal to $q_0$. Thus, in many embodiments, the present invention not only permits convenient use of the split function depending on user requirements and provides the user with various splitting options for selection, when the present invention is applied to a widescreen electronic device, the present invention also enables the user to use the electronic device as if it had two screens or multiple screens. Thus, in many embodiments, the present invention is particularly suitable for use in a widescreen electronic device to give full play to the strengths of the widescreen electronic device and to achieve highly efficient operations.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for splitting a display zone of a screen, comprising the following steps:
    detecting a number of pixels $p_0 \times q_0$ of the screen;
    receiving an activate option instruction;
    providing a selection dialog box interface in response to receipt of the activate option instruction, the selection dialog box interface listing a plurality of selections for selection, wherein the plurality of selections comprise one or more of (a) operating interfaces, (b) files, and (c) pages of open applications;
    receiving a splitting instruction, the splitting instruction containing a splitting number n the splitting instruction identifying one or more selections of the plurality of selections, wherein the one or more selections were selected through the selection dialog box;
    splitting the display zone of the screen into a main display region having $p_1 \times q_1$ pixels, and a number (n−1) of extension display regions, each having $p_i \times q_i$ pixels, where i=2~n, wherein a total number of width pixels of adjacent ones of the main and extension display regions from left to right of the display zone of the screen is substantially equal to $p_0$, and a total number of height pixels of adjacent ones of the main and extension display regions from top to bottom of the display zone of the screen is substantially equal to $q_0$; and
    displaying the one or more selections in the main and extension display regions, respectively.

2. The method for splitting a display zone of a screen according to claim 1, wherein the activate option instruction is generated through operating one of a physical key and a virtual key twice in succession.

3. The method for splitting a display zone of a screen according to claim 1, wherein the selection dialog box interface further lists settable options that are associated with displaying states.

4. The method for splitting a display zone of a screen according to claim 1, wherein the splitting instruction is generated through operating one of a physical key and a virtual key once, and the splitting instruction contains a preset splitting number n, where n=2.

5. The method for splitting a display zone of a screen according to claim 1, wherein the splitting number n contained in the splitting instruction is preset to be 2, and the display zone is split into the main display region and one extension display region, the main and extension display regions displaying identical contents, the content displayed in the extension display region being rotated 180 degrees relative to that displayed in the main display zone.

6. The method for splitting a display zone of a screen according to claim 5, wherein rotating of the content in the extension display region for display is activated upon receipt of the splitting instruction associated with detection of an angle of placement of the screen being substantially horizontal.

7. The method for splitting a display zone of a screen according to claim 1, further comprising a step of receiving an adjusting instruction to alter values of p or q of the adjacent ones of the main and extension display regions, the adjusting instruction being generated through detecting that a position of a cursor corresponds to adjoining borders of adjacent ones of the main and extension display regions, causing the cursor to change to a symbol indicating adjustability of positions of the adjoining borders, detecting a position of the symbol, and generating the adjusting instruction based on change in the position of the symbol.

8. The method for splitting a display zone of a screen according to claim 1, further comprising, prior to providing a selection dialog box interface, identifying one or more default selections for display; wherein the one or more default selections are identified according to the following logic:
    detecting if an active file contains a plurality of pages; and if so,
    displaying the plurality of pages respectively in the main and extension display regions; and if not,
    detecting if a plurality of files of the active application are opened; and if so,
    displaying the plurality of files of the active application in the main and extension display regions, respectively; and if not,
    displaying the active application and a most recently opened application in the main and extension display regions, respectively.

9. A system for splitting a display zone of a screen, said system being adapted for installation in an electronic device having a screen and comprising:
    a detecting module for detecting pixels $p_0 \times q_0$ of the screen of the electronic device;
    a splitting processor connected to said detecting module for receiving a splitting instruction containing a splitting number n and for splitting the display zone of the screen into a main display region having $p_1 \times q_1$ pixels, and a number (n−1) of extension display regions, each having $p_i \times q_i$ pixels, where i=2~n, wherein a total number of width pixels of adjacent ones of the main and extension display regions from left to right of the display zone of the screen is substantially equal to $p_0$, and a total number of height pixels of adjacent ones of the main and extension display regions from top to bottom of the display zone of the screen is substantially equal to $g_0$;
    an input module for inputting of the splitting instruction by a user, said input module including:
        one of a physical key adapted to be provided on a surface of the electronic device and a virtual key displayed on the screen, and
        a selection dialog box interface for display on the screen, said selection dialog box interface listing a plurality of selections for selection, wherein
        the plurality of selections comprise one or more of (a) operating interfaces, (b) files, and (c) pages of open applications, and
        the splitting instruction identifies one or more selections of the plurality of selections, wherein the one or more selections were selected through the selection dialog box; and
    a display module for connection with the screen and said splitting processor, and for displaying the one or more selections in the main and extension display regions, respectively.

10. The system for splitting a display zone of a screen according to claim 9, further comprising, prior to including the selection dialogue box interface for display on the screen, identifying one or more default selections for display, wherein the one or more default selections are identified according to the following logic:
    detecting if an active file contains a plurality of pages; and if so,
    displaying the plurality of pages respectively in the main and extension display regions; and if not, detecting if a plurality of files of the active application are opened; and if so, displaying the plurality of files of the active application in the main and extension display regions, respectively; and if not, displaying the active application and a most recently opened application in the main and extension display regions, respectively.

11. The system for splitting a display zone of a screen according to claim 9, wherein the selection dialog box interface further lists settable options in the applications, which are associated with displaying states.

12. The system for splitting a display zone of a screen according to claim 9, wherein said detecting module further detects if an angle of placement of the screen is substantially horizontal; and if so, the splitting number n contained in the splitting instruction received by said splitting processor is preset to be 2, and the display zone is split into the main display region and one extension display region, the main and extension display regions displaying identical contents, the content displayed in the extension display region being rotated 180 degrees relative to that displayed in the main display zone.

13. The system for splitting a display zone of a screen according to claim 9, further comprising an adjusting module connected to said detecting module and said splitting processor, said detecting module transmitting information to said adjusting module upon detecting that a position of a cursor corresponds to adjoining borders of adjacent ones of the main and extension display regions, said adjusting module controlling change of the cursor to a symbol indicating adjustability of positions of the adjoining borders in response to the information transmitted thereto, said adjusting module generating an adjusting instruction based on subsequent change in the position of the symbol as determined by said adjusting module from the information transmitted by said detecting module and transmitting the adjusting instruction to said splitting processor, said splitting processor altering values of p or q of the adjacent ones of the main and extension display regions based on the adjusting instruction.

14. A non-transitory computer-readable data storage medium comprising program instructions for causing a computer to execute a method for splitting a display zone of a screen of the computer, the method comprising:

detecting a number of pixels $p_0 \times q_0$ of the screen;

receiving an activate option instruction;

providing a selection dialog box interface in response to receipt of the activate option instruction, the selection dialog box interface listing a plurality of selections for selection, wherein the plurality of selections comprise one or more of (a) operating interfaces, (b) files, and (c) pages of open applications;

receiving a splitting instruction, the splitting instruction containing a splitting number n, the splitting instruction identifying one or more selections of the plurality of selections, wherein the one or more selections were selected through the selection dialog box;

splitting the display zone of the screen into a main display region having $p_1 \times q_1$ pixels, and a number (n−1) of extension display regions, each having $p_i \times q_i$ pixels, where i=2~n, wherein a total number of width pixels of adjacent ones of the main and extension display regions from left to right of the display zone of the screen is substantially equal to $p_0$, and a total number of height pixels of adjacent ones of the main and extension display regions from top to bottom of the display zone of the screen is substantially equal to $q_0$; and displaying the one or more selections in the main and extension display regions, respectively.

15. The non-transitory computer-readable data storage medium according to claim 14, wherein the splitting number n contained in the splitting instruction is preset to be 2, and the display zone is split into the main display region and one extension display region, the main and extension display regions displaying identical contents, the content displayed in the extension display region being rotated 180 degrees relative to that displayed in the main display zone.

* * * * *